W. ARCHER.
Refining Oil.
No. 1,989. Reissued June 13, 1865.
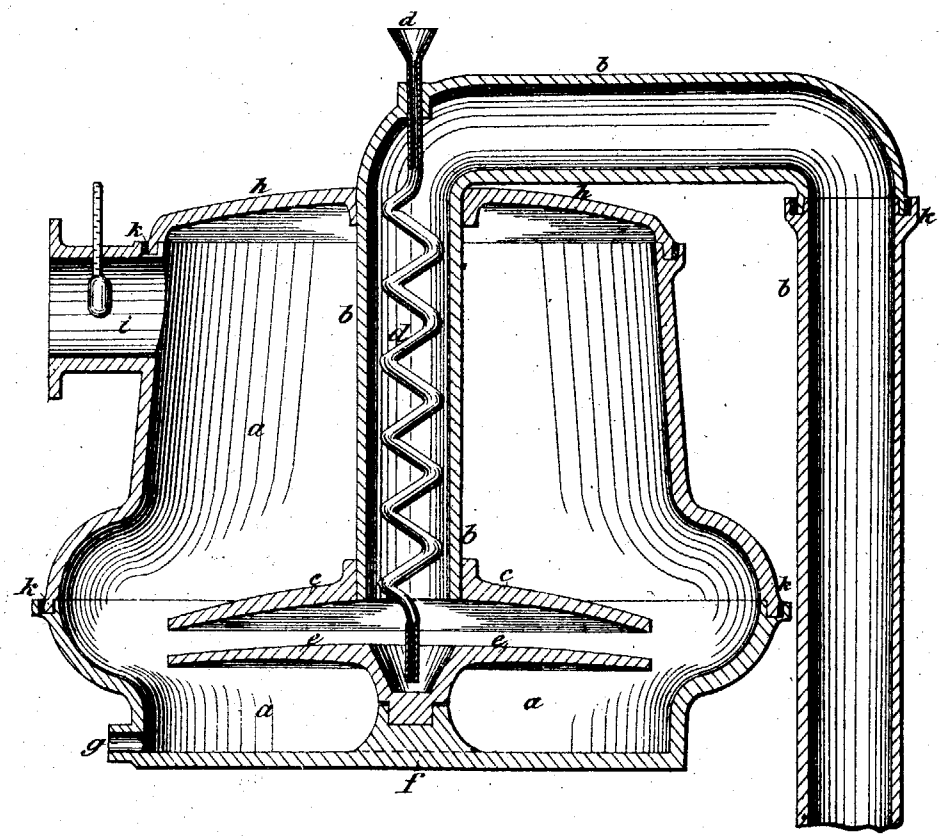
Witnesses:
Wm H. McGee
Cor. J. Rooney
Inventor:
William Archer

UNITED STATES PATENT OFFICE.

WILLIAM ARCHER, OF NEW YORK, N. Y., ASSIGNOR TO HIMSELF AND WM. P. DOWER, OF SAME PLACE.

IMPROVEMENT IN DISTILLING HYDROCARBON OILS.

Specification forming part of Letters Patent No. 44,137, dated September 6, 1864; Reissue No. 1,989, dated June 13, 1865.

*To all whom it may concern:*

Be it known that I, WILLIAM ARCHER, of the city, county, and State of New York, have invented a new and useful Method of Distilling Hydrocarbon and other Oils and Volatile Substances; and I do hereby declare that the following is a full and exact description thereof, reference being had to the drawing accompanying my successful application for Letters Patent for a similar invention, which said Letters Patent were issued the 6th day of September, 1864, and numbered 44,137, and of which this application is an amendment.

The process of distilling hydrocarbon and other oils and volatile substances has heretofore been by applying heat to the bottom of the containing vessel or reservoir, thereby evaporating them and separating the product by what is known in chemistry as "fractional distillation." In the employment of such a method there have arisen very many inconveniences, delays, and much waste. The design of my method of distillation is to obviate these objections. Hydrocarbon oils before distillation contain many volatile and highly inflammable, as well as explosive, substances, which may be evolved at different temperatures, and which are necessary to be separated in order to produce a safe, valuable, and uniform article.

The nature of my invention consists in a system by which superheated steam or hot air is applied to the continuous and fractional distillation of hydrocarbon and other oils and volatile substances in such manner that each grade or product shall be evolved and deposited in a separate or a single vessel, as desired.

To enable others to make and use my invention, I will proceed to describe its construction and operation.

The drawing exhibited is a cross-section of my invention. *a* is a metallic or composition still, vessel, or base, of any convenient form or dimensions, put together in sections or made complete. When constructed in sections, the joints *k k k k* are closely sealed with fusible metal or composition. *b* is a leading-pipe, connected with the steam or hot-air apparatus, and is made to run down into the lower chamber of the vessel *a*, as shown. This leading-pipe terminates in a metallic disk or deflector, *c*, resembling an inverted saucer, the diameter of which disk is made to conform in shape to the inner form of the vessel *a* and is slightly less in diameter.

*e* is a lower metallic disk, conforming to the deflector *c* in shape, diameter, and size, and is secured within from two to three inches of *c* by the step *f* in the center of the floor of the vessel *a*.

*d* is a straight or spiral feeding-tube, the lower end opening upon the lower disk, *c*, while the upper end passes through the leading-tube *b*, as shown, and is provided at the top with a hopper, for the reception of the substance to be distilled.

*h* is a removable cover, which, when the apparatus is in operation, is sealed by a joint and fusible metal packing.

*i* is the exhaust-pipe, which may be connected with any ordinary condensing apparatus.

*th* is a thermometer, inserted in the exhaust-pipe for the purpose of determining the temperature of the distilling vapor or air.

When I wish to operate my invention, I admit a continuous volume of superheated steam or hot air through the leading-pipe upon the lower disk, *e*, until the desired temperature is indicated by the thermometer. When this is attained, I admit a stream of oil or other substance to be distilled through the feeding-tube. This is received upon the center of the lower disk, *e*, and thence flows in a thin sheet or film toward the outer edge. All the volatile matter (contained in the substance thus exposed to the action of my apparatus) the boiling-point of which is not higher than the specific heat applied will mingle and ascend with the steam or hot air applied, and will pass off through the exhaust-pipe into the condenser, while all the matter whose boiling-point is higher than the specific heat applied will drop from the outer edge of the lower disk, *e*, to the floor of the distilling-vessel, and will be discharged through the tube *g*, and thereby pass into the feeding-tube *d* of the succeeding apparatus, in which the heat will be raised to the required degree necessary to volatilize the next heavier product, and this operation will be continued till the various specific products are all separated. I do not intend, however, to confine myself to any particular form or construction, as the apparatus described may be modified to suit a particular purpose, or to adapt my system to the ordinary stills now in use; and the disks may be made straight, inclined, or dishing downward, as shown; or the upper disk may, to suit certain purposes, be entirely dispensed with.

Having thus described the nature, operation, and construction of my invention, what I claim herein as new, and which I desire to secure by Letters Patent, is—

1. The continuous and fractional distillation and separation of hydrocarbon and other oils and volatile substances by the direct application of superheated steam or hot air to the surface of a flowing sheet, column, or shower of the substance to be distilled in the manner described or any modification thereof by which the same result may be accomplished.

2. The combination of the leading-tube *b* with the deflecting and receiving disks *c* and *s*, with the spiral or straight feeding-tube *d*, in the manner and for the purposes as described.

WILLIAM ARCHER.

Witnesses:
SAM. L. HARRIS,
JAMES MCMAHON.